INVENTORS
FOREST J. DYNAN
BRICE E. THORNTON
BY RICHARD G. WHITNAH

*Rolf M. Pitts*
ATTORNEY

INVENTORS
FOREST J. DYNAN
BRICE E. THORNTON
RICHARD G. WHITNAH
BY
*Roy M. Pitts*
ATTORNEY

United States Patent Office 3,243,815
Patented Mar. 29, 1966

3,243,815
RADAR TESTING APPARATUS
Forest J. Dynan, La Mirada, Brice E. Thornton, Santa Ana, and Richard G. Whitnah, Garden Grove, Calif., assignors to North American Aviation, Inc.
Filed Mar. 2, 1964, Ser. No. 348,633
11 Claims. (Cl. 343—17.7)

This invention relates to radar testing apparatus, and more particularly to apparatus for testing monopulse receivers.

The use of sum-and-difference type monopulse receivers to provide a signal indicative of the direction of a detected target (relative to antenna boresight axis) is well-known in the art. For example, in a sum-and-difference monopulse radar receiving system, the microwave signals received by two antenna apertures are combined in a multichannel signal section to provide two microwave signals, one being indicative of the sum of the received signals and the other indicative of the difference between the received signals.

In a so-called "off-boresight data" monopulse radar system, the received signals caused by a detected target are processed to provide information as to the angular amount by which the target is off the boresight or directional axis of the directional antenna of the monopulse radar. One method of obtaining such target angle information is to divide the difference signal by the sum signal, by means of separate sum and difference automatic gain control (AGC) circuits commonly employing the output of the sum channel AGC as a control signal. In this way, a normalized resultant difference signal is provided which is substantially invariant with changes in received signal strength due to target range or target size or target coefficient of reflectivity. Instead, the resultant normalized difference signals varies only in response to variations in the angle off boresight of the detected target (measured in the plane of the coplanar array of the two antenna apertures). Hence, such resultant signal is said to be indicative of the target angle off boresight.

In so "processing" or normalizing the difference signal, it is required that the sum and difference signals be amplified by like amounts in order to avoid disturbing or distorting the relative signal level or gain relationship between them. Any difference in the relative gain relationship between them is referred to as a gain-tracking error. Such error arises from the differences or performance tolerances existing between the separate amplifiers employed to separately amplify the sum and difference signals, and results in loss of accuracy of the indicated target angle-off-boresight.

In practice, it is difficult to build and adjust two AGC signal amplifier channels that will behave exactly alike for all signal levels (e.g., for weak signals and strong signals). In other words, the gain performance of the two AGC amplifiers will not "track" or identically follow each other at all levels of the common gain control input.

In practice the sum channel signal and difference channel signal will be of considerably different signal levels, and hence, gain tracking errors are encountered. Further, the sum channel signals, generally being larger in amplitude than the difference signals, will vary over a wider range of signal levels, as to make difficult the use of a single, static adjustment or matching of the conventional difference channel AGC amplifier to the sum channel AGC amplifier. Moreover, the effects of performance drift as a function of time cause subsequent mismatch of AGC amplifiers that may have been matched at an earlier point in time.

By means of the concept of the subject invention, testing apparatus is provided for operating in conjunction with a monopulse receiver for measuring and adjusting the gain tracking performance thereof.

In a preferred embodiment of the subject invention, there is provided a sum and difference type monopulse receiver having adjustable-gain sum and difference channel amplifiers and providing an output signal indicative of the target angle of a detected target. There is also provided signal injection means adapted for severally injecting test signals into the receiver amplifiers, and means for adjusting the amplitude of one of the signals-to-be injected in a selected relation relative to the other of the signals. Indicating means responsive to both the amplitude-adjusting means and the monopulse receiver output signal indicates the response of the receiver to the signal injection means. There is further provided receiver-gain adjusting means responsive to the indicating means for adjusting the gain of one of the receiver amplifiers.

By means of the above described arrangement, the relative gains of the receiver amplifiers are adjusted in such a sense as to reduce the differences therebetween, whereby gain tracking errors are reduced.

Accordingly, it is an object of the subject invention to provide means for indicating the gain tracking errors of a monopulse receiver.

It is another object of the subject invention to provide radar testing apparatus for measuring the gain tracking-performance of a monopulse receiver to both large- and small-amplitude, simulated target signals.

It is still another object to provide calibration means for automatically adjusting the relative gains of the several amplifier channels of a monopulse receiver so as to reduce gain tracking errors.

It is yet another object of the invention to provide improved monopulse receiving means having reduced gain-tracking errors.

It is a further object of the invention to improve the gain-tracking performance of a monopulse receiver.

These and other objects of the invention will become apparent from the following description, taken together with the accompanying drawings, in which.

In the figures, like reference characters refer to like parts.

Figure 1:
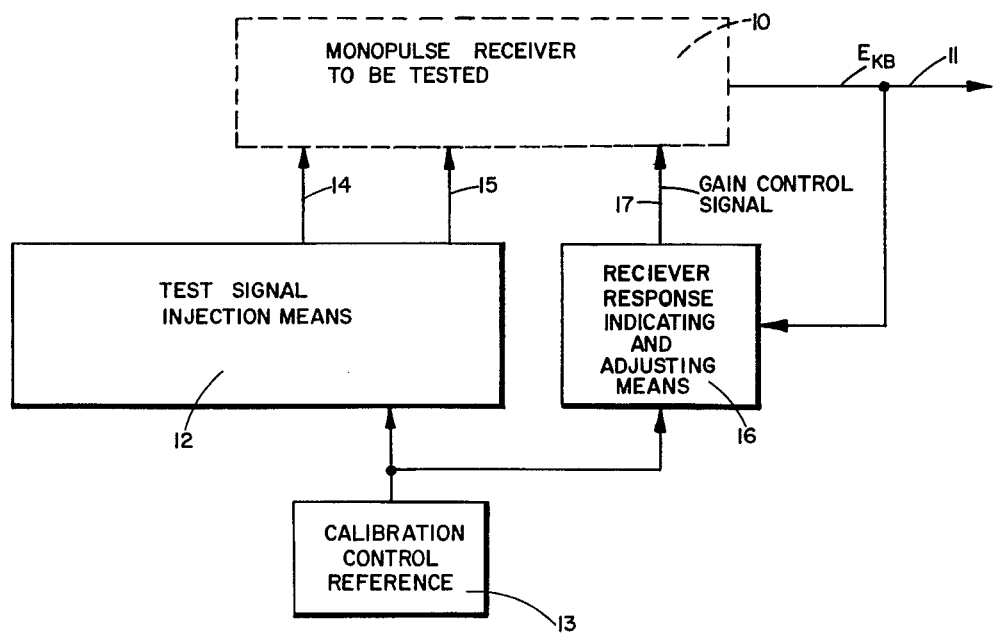
FIG. 1 is a block diagram of the concept of the invention.
Figure 2:
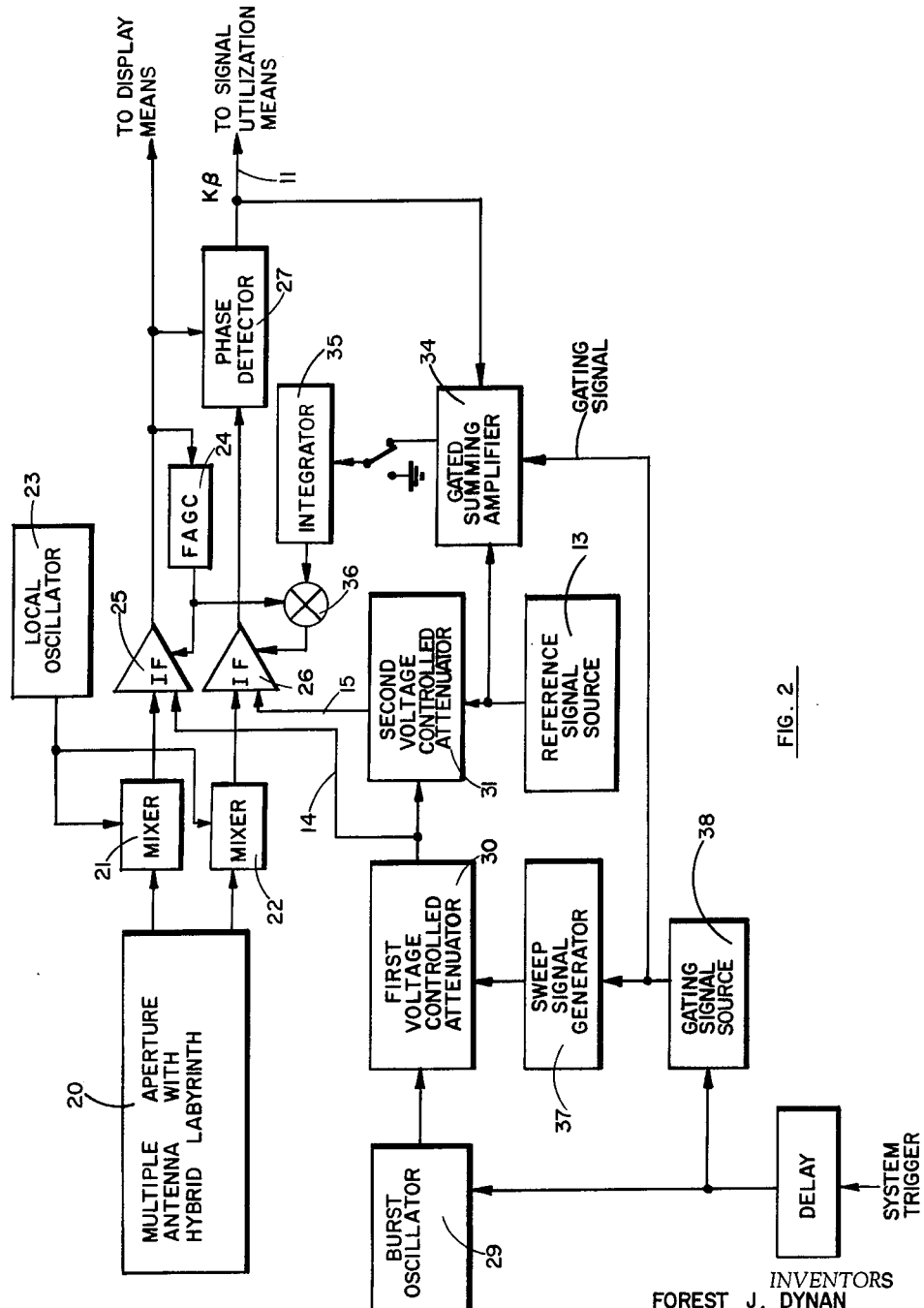
FIG. 2 is a block diagram of a system embodying the device of the invention.

Referring now to FIG. 1, there is illustrated a block diagram of the concept of the invention. There is provided a monopulse radar-to-be-tested 10 and providing an output on line 11 indicative of the target angle-off-boresight of either a detected target or simulated target. The construction and arrangement of such receiver is well known in the art, an exemplary arrangement of which is shown in FIG. 2. Accordingly, receiver 10 is shown in FIG. 1 in block form only.

There is also provided test signal injection means 12 arranged for severally-injecting test signals into the several amplifier-channels of monopulse receiver 10 via signal lines 14 and 15. A calibration control reference or source 13 of a calibrated reference signal, is operatively connected to signal-injection means 12 for adjusting the relative signal levels between the severally injected signals on lines 14 and 15 of element 12, corresponding to a selected (simulated) target angle condition of the detected target simulated by the injection signals.

Receiver response-indicating means 16 responsive to both the reference signal source 13 and the receiver (target-angle) output signal, provides a control signal indicative of the difference therebetween. Such output signal may be fed on line 17 to monopulse receiver 10 for adjusting the gain of one of the amplifier channels thereof.

In normal operation of the receiver testing apparatus in FIG. 1, signal injection means 12 excites the intermediate-frequency amplifier stages of the monopulse receiver amplifier channels to produce a receiver response. Calibration means 13 controls the relative amplitudes of the injected signals, which also serves as a reference for the receiver response to the injection signals. Indicating and adjusting means 16, in cooperating with receiver 10, causes the gain of one of the intermediate-frequency amplifier channels of receiver 10 to be varied so as to reduce any amplitude difference existing between the calibration reference and the receiver output.

Hence, gain tracking errors in the monopulse receiver amplifier, which tend to produce a difference between the calibration signal and the receiver output, are correspondingly reduced when the calibration difference is reduced.

Also, the performance of the calibration system of FIG. 1 is not critical to drifting, or variation, in the calibration signal source 13, for the reason that the receiver (target-angle) output signal correspondingly varies in response to variation of the calibration signal, whereby the sense of a difference between the two is not necessarily changed and the control action of response-indicating means 16 is unaffected.

As has been indicated above, the normally intended response for the monopulse receiver 10 of FIG. 1 is to provide a signal indicative of the target angle or angle-off-boresight of a detected target, which signal is invariant with the signal strength of the detected target itself (within a design range of receiver signal levels). Accordingly, means may be incorporated for simulating targets of varying signal strength for testing such performance feature of the radar, as shown in FIG. 2.

Referring to FIG. 2, there is shown a block diagram of a system embodying the concept of the invention. There is provided a monopulse radar receiver of a type commonly known in the art as a sum-and-difference detector; and comprising a multiple-aperture antenna 20 with hybrid labyrinth for providing two several microwave ouputs indicative of the sum and difference respectively of the microwave signals received by at least two of the apertures of antenna 20. The microwave outputs of antenna 20 are fed to respective signal channels comprising mixers 21 and 22, each of which combines the microwave input thereto with the energy from a local oscillator 23, in order to reduce said microwave inputs to intermediate frequency (IF) energy suitable for amplification and further signal processing by corresponding IF automatic gain control amplifiers 25 and 26.

The output of the sum channel amplifier 25 is employed by a fast automatic gain control (FAGC) circuit 24 for commonly adjusting the gains of amplifiers 25 and 26 inversely with the input level to sum channel amplifier 25, whereby the signal levels of the outputs of amplifiers 25 and 26 are substantially invariant with changes in the signal strength of a detected target, and the output of difference channel amplifier 26 is indicative of the target angle of a detected target, as is well understood in the monopulse art. The IF output of difference amplifier 26 is detected by means of a phase-sensitive detector 27 (employing the substantially fixed amplitude output of sum amplifier 25 as a phase reference), whereby detector 27 provides a video output indicative of both the sense and amplitude of the angle-off-boresight of a detected target.

There is also provided in FIG. 2 signal injection means adapted for severally injecting test signals into amplifiers 25 and 26 of the monopulse receiver. Such means is comprised of a burst oscillator 29 adapted to be selectively responsive to the system trigger of the radar system of FIG. 2, for providing a burst of IF energy at a selected time interval after the occurrence of the system trigger. The output of oscillator 29 is attenuated, by means of a first voltage-controlled attenuator 30, to a level suitable for several applications of lines 14 and 15 to the corresponding inputs of amplifiers 25 and 26, respectively.

The signal input on line 14 to sum amplifier 25 corresponds to a sum signal indicative of the strength of a simulated target, while the signal input on line 15 to difference amplifier 26 corresponds to both the signal strength and target angle of the simulated target. A second voltage-controlled attenuator 31 is interposed between the output of first attenuator 30 and signal line 15 for providing a selected attenuation indicative of a selected target angle, in response to a control signal applied to a control input thereof.

The construction and arrangement of voltage-controlled attenuators is known in the art, a particularly advantageous arrangement for which being described in a patent application, Serial No. 355,666 filed by Curtis Lee and Philip A. Ross, assignors to North American Aviation, Inc., assignee of the subject invention. Therefore, elements 30 and 31 are shown in FIG. 2 in block form only.

The control input of second attenuator 31 is responsively connected to a source 13 of a D.-C. reference signal, corresponding to a selected target angle-off-boresight to be simulated. Hence, source 13 and attenuator 31 comprise means for adjusting the amplitude of the signal-to-be-injected on line 15 relative to that of the signal to-be-injected on line 14, whereby the level of one of the signals-to-be-injected is adjusted in a selected relation relative to that of the other of the signals.

There is further provided in FIG. 2 means corresponding to element 16 of FIG. 1 for adjusting the gain of one of receiver amplifiers 25 and 26, and comprising gated summing amplifier 34, integrator 35, and second signal summing means 36. A first and second input of summing amplifier 34 are responsively connected to respective outputs of reference source 13 and receiver phase detector 27, for providing a signal indicative of the difference between the output of calibration source 13 and the receiver output occurring on line 11 (in response to the output of source 13). An input of integrator 35 is responsively connected to the output of gated amplifier 34 for providing an output indicative of the time integral thereof. The output of integrator 35 is combined with the control signal input to difference amplifier 26 (from FAGC element 24) to provide a bias input thereto.

The bias input to amplifier 26 changes the gain thereof as necessary, changing the output on line 11 in response to signal source 13, whereby the difference therebetween (i.e., the input to integrator 35) approaches zero or a null. Then, in response to the null input, the output of integrator 35 remains at that bias necessary to provide a desired, calibrated, relative gain relationship between corresponding amplifiers 25 and 26 of the multiple-channel signalling device of FIG. 2.

Although summing amplifier 34 and integrator 35 have been illustrated as separate elements, in practice the functions of both may be combined in a single integrating operational amplifier, as is understood in the art.

Summing means 36 may be comprised of two summing resistors each having a first terminal commonly connected to the control input of amplifier 26, a respective second terminal of each resistor serving as one of the input terminals of element 36, as is well understood in the art.

Means is also included in FIG. 2 for adjusting the simulated signal strength of the targets simulated by the arrangement of FIG. 2. Such functional feature is desired in order to evaluate the receiver response to target signals of varying strength, and to average out possible variations in such response, in effecting gain adjustment of the receiver-amplifier 26 of FIG. 2.

Means for varying the simulated target signal strength is provided in FIG. 2 by a sweep signal generator 37 in cooperation with first voltage controlled attenuator 30 and a gating signal source 38. Whenever it is desired to test and calibrate the monopulse receiver of FIG. 2, a test gate signal from source 38 is applied to sweep signal generator 37 and gated amplifier 34, thereby causing generator 37 to generate a sweep signal or sawtooth signal (i.e., a periodic signal whose amplitude periodically increases linearly from a null to a peak and then collapses to zero), and also causing gated amplifier 34 to turn-on (or become operative) in synchronism with generator 37. The variable-amplitude output of generator 37 is applied to the control input of attenuator 30, whereby the signal levels on lines 14 and 15 are correspondingly adjusted by the controlled adjustment of common attentuator 30. If the AGC arrangement of elements 24, 25 and 26 cooperate as intended, the receiver output on line 11 with be invariant with variations in the output of generator 37.

If, however, the output on line 11 tends to vary in correspondence with variations in the output of generator 37, the normal operation of integrator 35 averages out such variations, whereby an average calibration bias is maintained at the output thereof, and which is a "best fit" bias for the range of target signal levels produced on line 15 in response to the combined outputs of elements 29 and 37.

Where it is desired to test the monopulse receiver of FIG. 2 during normal operational use thereof, the output on line 11 may be a composite signal indicative of both the simulated target and an actual target occuring at a range corresponding to the delay time at which the test signals are injected. Hence, a good calibration function may be difficult to obtain. Such difficulty may be reduced, and "on-stream," or operational, testing effected by delaying the burst oscillator 29 and gating signal source 38 relative to the system trigger, to the extent that test signal injection occurs during the latter portion of the pulse-radar system pulse repetition period when any received signal (from a distant target corresponding to such delay) is normally so attenuated as to be below the threshold of the system. In this way, the system display (for ranges of interest) is not disturbed and effective calibration can be effected. In other words, mutual interference of the target display function and the system calibration function are reduced.

Alternatively, the system trigger may be gated to alternately pulse the burst oscillator 29 (of FIG. 2) and the transmitter (not shown) associated with the receiver of FIG. 2, whereby the operational mode and calibration mode of the illustrated receiver are each operative during mutually exclusive alternate pulse repetition periods.

Accordingly, improved means has been described for operational calibration of the target angle detector mode of a monopulse receiver, whereby gain tracking errors are minimized in such monopulse receiver.

Although the device of FIG. 2 is illustrated as injecting intermediate frequency (IF) energy pulses into the IF stage of the receiver, the concept of the invention may be applied to the injection of microwave energy to the respective inputs of mixers 21 and 22 instead of amplifiers 25 and 26. In such circumstance, burst oscillator 29 would be comprised of a source of microwave energy and attenuators 30 and 31 would be comprised of voltage-controlled microwave attenuators such as wave-guide sections having varactor diodes mounted therein and shunting thereacross, and responsively connected to a respective one of elements 13 and 37.

Although the invention has been illustrated and described in detail, it is to be clearly understood that the same is by way of illustration and example only, and is not to be taken by way of limitation; the spirit and scope of this invention being limited only by the terms of the appended claims.

We claim:

1. In a sum-and-difference type monopulse receiver having adjustable-gain, sum channel and difference channel amplifiers and providing an output signal indicative of the target angle of a detected target, receiver testing means comprising signal injection means adapted for severally injecting test signals into said receiver amplifiers;

means for adjusting the amplitude of one of said signals-to-be-injected in a selected relation relative to that of the other of said signals; and means responsive to said second mentioned means and adapted to be responsive to said receiver output signal for indicating the response of said receiver to said first and second mentioned means.

2. The device of claim 1 in which there is further provided means responsive to said third mentioned means and adapted for adjusting the gain of one of said receiver amplifiers.

3. The device of claim 1 in which there is further provided means cooperating with said signal injection means for varying the signal level of one of said injected test signals and correspondingly varying the other of said injected test signals.

4. The device of claim 1 in which there is further provided gating means for gating off said third mentioned means for indicating in the absence of said injected test signals.

5. In a sum-and-difference type monopulse receiver having adjustable-gain sum channel and difference channel amplifiers and providing an output signal indicative of the target angle of a detected target, receiver testing means comprising signal injection means for severally injecting test signals into said receiver amplifiers;

a source of a reference signal arranged to cooperate with said first mentioned means for adjusting the amplitude of one of said signals-to-be-injected in a selected relation relative to the other of said signals, corresponding to a selected target angle;

signal comparison means responsive to said output of said receiver and said source for providing a signal indicative of the difference therebetween; and signal integrating means responsive to said signal comparison means arranged for adjusting the gain of one of said receiver amplifiers.

6. The device of claim 5 in which there is further provided common means for concurrently gating on said signal injection means and said signal comparison means, whereby said signal comparison means is disabled in the absence of said injected test signals.

7. The device of claim 5 in which there is further provided means cooperating with said signal injection means for varying the signal level of one of said injected test signals and correspondingly varying the other of said injected test signals.

8. The device of claim 5 in which said signal injection means comprises a source of IF pulsed energy; and a first and a voltage controlled second attenuator connected in tandem; the outputs of respective ones of said first and second attenuators being connected to the input of said sum channel and difference channel amplifiers respectively, a respective input and control input of said first and second attenator being connected to said IF pulsed energy source and said reference signal source respectively.

9. In a sum-and-difference type monopulse receiver having adjustable-gain sum channel and difference channel amplifiers and providing an output signal indicative of the target angle of a detected target, receiver testing means comprising a source of pulsed IF energy;

a first signal attenuator having an input connected to said source for providing a first attenuated IF output;

a voltage-controlled second attenuator having an input responsive to said first attenuated output for providing a second attenuated output and further having a control input;

a source of a reference signal operatively connected to the control input of said second attenuator for the attenuation of said second attenuator;

signal comparison means responsive to said output of said receiver and said source for providing a signal indicative of the difference therebetween; and signal integrating means responsive to said signal comparison means and arranged for adjusting the gain of one of said receiver amplifiers in a sense tending to reduce said difference.

10. In a sum-and-difference type monopulse receiver having adjustable-gain sum channel and difference channel amplifiers and providing an output signal indicative of the target angle of a detected target, receiver testing means comprising a source of pulsed IF energy;

a first voltage-controlled signal attenuator having an input connected to said source for providing a first attenuated IF output;

a second voltage-controlled attenuator having an input responsive to said first attenuated output for providing a second attenuated output, each of said attenuators further having a control input;

a sweep signal generator operatively connected to the control input of said first attenuator;

a source of a reference signal operatively connected to the control input of said second attenuator for the attenuation of the output of said second attenuator;

signal comparison means responsive to said output of said receiver and said source for providing a signal indicative of the difference therebetween; and signal integrating means responsive to said signal comparison means and arranged for adjusting the gain of one of said receiver amplifiers in a sense tending to reduce said difference.

11. The device of claim 10 in which there is further provided a source of a test gate signal operatively cooperating with said first attenuator and said signal comparison means whereby said summing means is disabled in the absence of said pulsed IF energy.

References Cited by the Examiner

UNITED STATES PATENTS 2,881,423   4/1959   Jacobson _____ 343—16.1

CHESTER L. JUSTUS, *Primary Examiner.*

R. E. KLEIN, R. D. BENNETT, *Assistant Examiners.*